(12) United States Patent
Faulhaber et al.

(10) Patent No.: US 8,036,314 B2
(45) Date of Patent: Oct. 11, 2011

(54) AUTOMATIC CORRECTION OF DATA POLARITY ON A DIFFERENTIAL SERIAL BUS

(75) Inventors: Steven F. Faulhaber, Bloomington, MN (US); Luke E. McKay, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 739 days.

(21) Appl. No.: 12/129,173

(22) Filed: May 29, 2008

(65) Prior Publication Data

US 2009/0296859 A1 Dec. 3, 2009

(51) Int. Cl.
*H04L 27/00* (2006.01)
(52) U.S. Cl. .......................................... 375/316
(58) Field of Classification Search .................. 375/316, 375/257; 341/58, 57, 143
See application file for complete search history.

(56) References Cited

U.S. PATENT DOCUMENTS

| 5,877,645 A * | 3/1999 | Comino et al. ............... 327/350 |
| 7,733,980 B2 * | 6/2010 | Beukema et al. ............. 375/300 |

* cited by examiner

*Primary Examiner* — Khai Tran
(74) *Attorney, Agent, or Firm* — Duft Bornsen & Fishman LLP

(57) ABSTRACT

Methods and structure described herein provide for detecting data inversions between electronic devices in communication with one another and automatically correcting those that inversions. An electronic device may be configured with a receiver that is configured for receiving differential serial data from a transmitter of another electronic device. The differential serial data is formatted according to a particular communication protocol associated with the electronic devices. The receiver detects an invalid sequence in the received differential serial data, such as an inverted SAS primitive, and automatically change the receive logic of the receiver such that subsequent received differential serial data is in the proper polarity. The transmitting device does not require notification of the change in receive logic.

19 Claims, 3 Drawing Sheets

AUTOMATIC CORRECTION OF DATA POLARITY ON A DIFFERENTIAL SERIAL BUS

BACKGROUND

1. Field of the Invention

Generally, the invention relates to detecting data inversions between electronic devices in communication with one another. More specifically, the invention relates to detecting a data inversion based on the determination of a received invalid sequence of data and automatically correcting the data inversion by logically changing the polarity of the received data.

2. Discussion of the Related Art

Differential Signaling, such as Low voltage differential signaling (LVDS), is generally a type of serial data communications where a voltage difference between two wires is used to convey information. In LVDS, a transmitter simultaneously applies a voltage to a wire and the inverse of the voltage to a paired wire. When summed together, the voltage equals zero and any electromagnetic radiation (EMR) generated by one wire is canceled out by the other. A receiver subtracts the voltage on the two wires to recover the signal sent by the transmitter. Subtracting the signals on the two wires generally allows the same signal to be transmitted with half the voltage on each wire, thereby using less power. LVDS also improves signal to noise ratio (SNR) because any noise added to the wires is roughly uniform between the wires and removed by the receiver. Decreased transmit power, decreased EMR, and increased SNR make LVDS very useful in high speed data communications.

Accordingly, LVDS is often employed in computer devices requiring relatively fast data transfer rates, such as computer disk drives. The high speed of LVDS and its use of in-channel synchronization generally allows more data to be sent using fewer wires than can be done with a normal parallel bus. Some examples of LVDS used in computer communications include HyperTransport, SCSI, RS-422, RS-485, Ethernet, Universal Serial Bus (USB), Serial Advanced Technology Attachment (SATA), Serial Attached Small Computer System Interface (SAS), and FireWire.

Many computer devices further enhance the reliability of the transmitted data by formatting the data with a communications protocol. A communications protocol is a set of standard rules for data representation, signaling, authentication, and error detection and correction used in transmitting information. One example of such a protocol includes the PCI express (PCIe) protocol. PCIe is a "point-to-point" bus protocol that removes the need for arbitrating with a computer bus such that a transmitter need not wait until the bus is free to transmit data. One feature of PCIe is its ability to negotiate communications between the transmitter and receiver. For example, when a transmitting computer device (e.g., a host processor on a motherboard) wishes to transmit data to a receiving computer device (e.g., a PCIe card coupled to the motherboard), the transmitting computer device may negotiate communications through a "handshaking" sequence that the receiving computer device acknowledges. In this regard, the transmitting computer device may transfer a sequence of data that is used by the receiving computer device to determine the polarity of the data being transmitted. If the receiving computer device determines that the polarity of the data is inverted, the receiving computer device may inform the transmitting computer device of the data inversion such that one of the computer devices reverses polarity.

While this polarity negotiation between computer devices ensures that the devices will be communicating in the correct polarity, it generally requires implementation within both transmitting computer devices and receiving computer devices. However, some communication protocols are not configured with such a polarity negotiation. Accordingly, devices operating with these polarity correction lacking protocols require design assurance that the devices are properly connected. For example, the SAS protocol does not include a specific polarity checking sequence in which a receiving device may determine a polarity inversion and notify the transmitting device of that inversion. Accordingly, designers must assure that a SAS interface to a SAS device, such as a computer disk drive, has its serial data connections coupled to the device in the correct polarity during assembly. Otherwise, literally half of the SAS devices may require reconfiguration after assembly.

It is evident from the above discussions that there is a need for automatically correcting data inversions for computer devices using communication protocols that lack specific polarity checking sequences.

SUMMARY

The present invention solves the above and other problems, thereby advancing the state of the useful arts, by providing methods and structure for detecting data inversions between electronic devices in communication with one another and automatically correcting those inversions. In this regard, an electronic device may be configured with a receiver that is configured for receiving differential serial data from a transmitter of another electronic device. The differential serial data is formatted according to a particular communication protocol associated with the electronic devices. The receiver is adapted to detect an invalid sequence in the received differential serial data and automatically change the receive logic of the receiver such that subsequent received differential serial data is in the proper polarity. For example, a computer disk drive may be configured to communicate differential serial data that is formatted according to the SAS protocol. The receiver of the computer disk drive may detect an inverted SAS primitive by comparing the received data stream to a set of inverted SAS primitives. Once the inverted SAS primitive is detected, the receiver may automatically change its receive logic without notifying the transmitter such that subsequent SAS differential serial data is processed in the correct polarity.

One aspect of the invention regards a data receiver that includes a data interface adapted to receive differential serial data. The data receiver also includes a detector communicatively coupled to the data interface and adapted to detect a data inversion in the received differential serial data. The detector detects the data inversion by determining an invalid sequence in the received differential serial data and wherein the detector is further adapted to generate a control signal used to change polarity of subsequent differential serial data. The data receiver also includes data inversion logic adapted to receive the control signal and change the polarity of the received differential serial data.

Another aspect of the invention regards a method that includes receiving differential serial data, detecting a polarity inversion in the received differential serial data by determining an invalid sequence in the received differential serial data, and changing polarity of subsequent received differential serial data in response to detecting the polarity inversion.

DETAILED DESCRIPTION OF THE DRAWINGS

Figure 1:
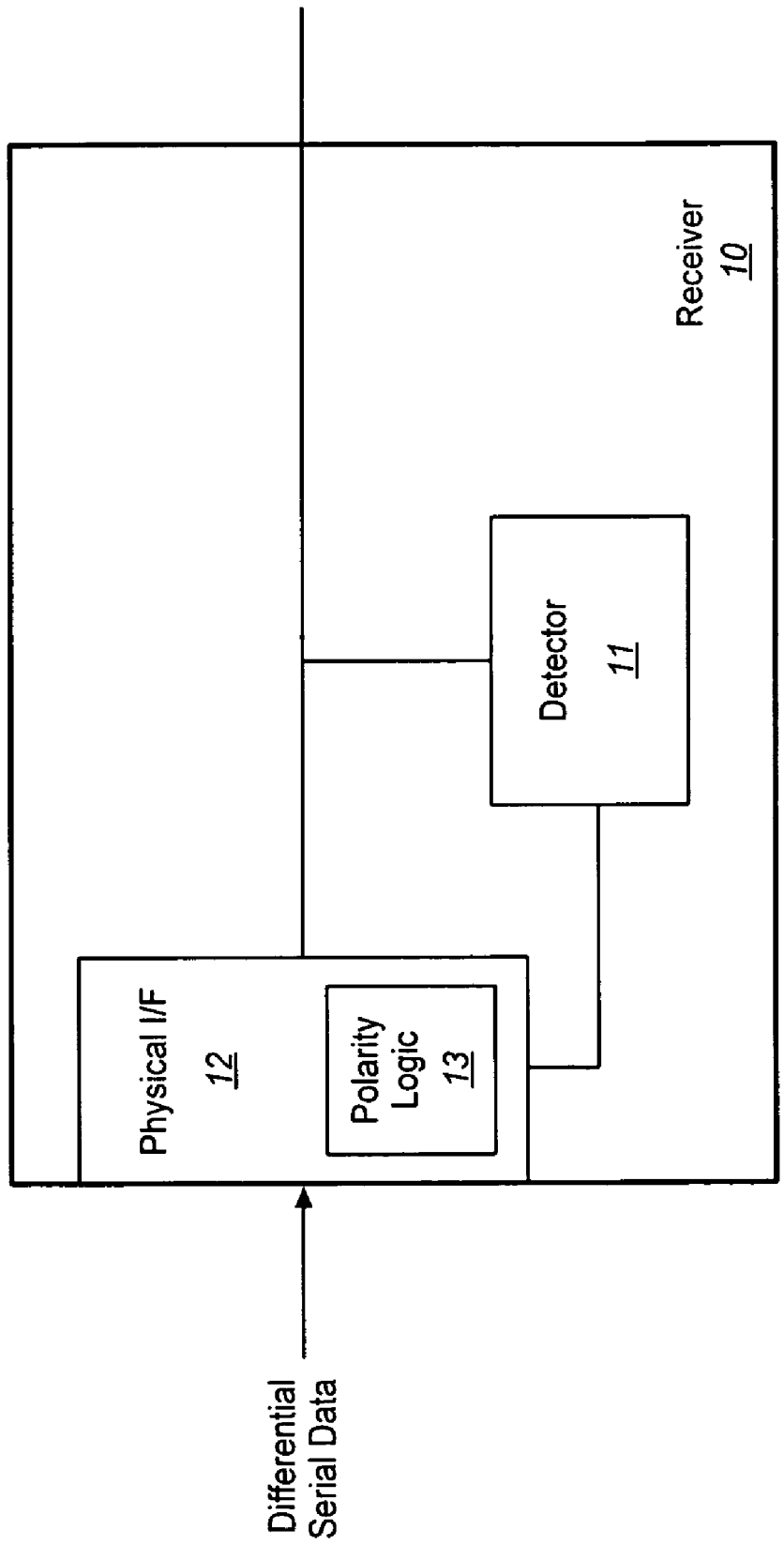
FIG. 1 is a block diagram of an exemplary data receiver capable of detecting polarity inversions in received differential serial data.

FIG. 1 is a block diagram of an exemplary data receiver 10 capable of detecting polarity inversions in received differential serial data. The data receiver 10 includes a physical interface 12 that is used to receive differential serial data from an electronic device external to the data receiver. For example, the receiver 10 may be implemented with an electronic device, such as a computer disk drive, that is communicatively coupled to a computer bus to receive electronic data from another device coupled thereto. The physical interface 12, in this embodiment, includes polarity logic 13 that is used to change the polarity of received differential serial data when a polarity inversion is detected in the data. In this regard, the receiver 10 also includes a detector 11 that monitors the received serial data to detect a polarity inversion in the received data based on an invalid sequence in the data. For example, the differential serial data received by the physical interface 12 may be formatted according to a particular communication protocol. The receiver 10, being configured to communicate with another electronic device via the protocol, may receive a sequence of data bits corresponding to a proper protocol bit format (e.g., a proper number of expected bits received). The detector 11 may observe this received sequence of data bits and determine that the sequence of data bits does not correspond to a valid protocol sequence, though an inverted protocol is detected. Based on this determination, the detector 11 may generate a control signal that is used by the polarity logic 13 to invert the polarity of subsequent data received by the physical interface 12.

To illustrate the detection of an invalid protocol sequence, a brief summary of one particular protocol is now discussed. The SAS protocol is a point-to-point serial data transfer protocol generally designed to move data to and from computer storage devices, such as computer disk drives and tape drives. The SAS protocol is developed and maintained by the T10 technical committee of the International Committee for Information Technology Standards (INCITS) and promoted by the SCSI Trade Association (STA).

In the SAS protocol, data "characters" are configured with a "Zxx.y" nomenclature where the "Z" represents "D" for data characters and "K" for control characters. The "xx.y" portion of the character represents bits of an 8 b/10 b encoding process (8 b/10 b encoding is known to those skilled in the art). For example, an unencoded information byte is composed of eight information bits A, B, C, D, E, F, G, H and the control variable Z. This information is encoded into the bits a, b, c, d, e, i, f, g, h, j of a 10-bit character. An information bit contains either a binary zero or a binary one. A control variable has either the value D or the value K. When the control variable associated with an unencoded information byte contains the value D, that byte is referred to as a data byte. When the control variable associated with an unencoded information byte contains the value K, that byte is referred to as a control byte. The information bit labeled A corresponds to bit 0 in the numbering scheme, B corresponds to bit 1, and so on, as shown here:

| Bit Notation | 7 | 6 | 5 | 4 | 3 | 2 | 1 | 0 | Control Variable |
|---|---|---|---|---|---|---|---|---|---|
| Unencoded Bit Notation | H | G | F | E | D | C | B | A | Z |

Thus, bit H is the most significant bit of the byte and bit A is the least significant bit of the byte. The "xx" is the decimal value of the binary number composed of the bits E, D, C, B, and A of the unencoded information byte in that order and the "y" is the decimal value of a binary number composed of the bits H, G, and F of the unencoded information byte in that order.

With the encoding defined, the SAS protocol can be configured as "dwords" that include four 8 b/10 b characters (32 serial data bits or 40 8 b/10 encoded serial data bits). Generally, it is advantageous to have the same number of binary ones as binary zeros transmitted on a twisted pair of wires to prevent charge from forming on the wires. To ensure that roughly the same number of ones and zeros are transmitted, each character is represented by two ten bit binary sequences, one positive and one negative. A positive binary representation contains either five or six binary ones and is used when more binary zeros have been transmitted than binary ones. A negative binary representation contains either four or five binary ones and is used when more binary ones have been transmitted than binary zeros. If a character has a positive representation that contains five binary ones, the character's negative representation contains five binary ones. Similarly, if the positive representation of a character contains six binary ones, then the character's negative representation contains four binary ones. Some characters, such as the k28.5 character, have positive and negative representations that are inverses of each other.

A SAS link generally has one of four states: 1. D.C. Idle; 2. character transmission; 3. OOB transmission; and 4. Speed Negotiation. When a link is in the D.C. Idle state, no data is transmitted and the data lines have a voltage of roughly 0 V. When the link is in the character transmission state, the transmitter constantly transmits dwords. These dwords are comprised of four 8 b/10 b characters (32 bits or 40 8 b/10 b encoded bits). The dwords can either be data dwords which are comprised of the sequence Dxx.y Dxx.y Dxx.y Dxx.y or primitives (e.g. control characters) which are comprised of the sequence Kxx.y Dxx.y Dxx.y Dxx.y. When the link is in the OOB transmission state, the transmitter transmits fixed bursts of ALIGN(0) primitives. When the link is in the speed negotiation state, the transmitter transmits ALIGN(0) primitives at varying speeds until a lock is achieved. Afterwards, the transmitter transmits ALIGN(1) primitives.

For a SAS link to be established, a receiver detects the ALIGN(0) primitives sent during speed negotiation. If the polarity of the transmitter does not match the polarity of the receiver, all of the bits are read backwards and the receiver detects k28.5 D21.5 D21.5 D27.3 dwords instead of the ALIGN(0)s. Since all of characters in the dwords are valid, speed negotiation continues until the ALIGN(1) primitive is sent. However, the inverse of the ALIGN(1) is not a valid primitive, so speed negotiation does not complete.

One reason that the polarity between devices may be inverted includes the improper cable connection between the two devices. If the polarity is reversed in a SAS device, speed negotiation does not complete and the link does not establish, because, like other protocols, the SAS protocol does not include a polarity correction sequence that enables devices to automatically detect data inversions and correct them by changing their reception and/or transmission logic.

The detector 11, in this regard, may monitor the data being received at the physical interface 12 of the receiver 10 to determine when an invalid sequence of data has been received. In doing so, the detector 11 may determine that the invalid received sequence of data is an inverted protocol sequence, such as the ALIGN(0) primitive, by comparing the invalid received sequence to a plurality of valid protocol sequences. If the detector 11 determines that the invalid protocol sequence is actually a valid protocol sequence being received in the incorrect polarity the detector 11 may in turn generate a control signal that changes the polarity logic 13 such that subsequent data is received in the correct polarity. To illustrate, a SAS protocol device implementing the receiver 10 may determine that an invalid primitive is actually a valid, yet inverted, ALIGN(0) primitive at the onset of communications between the SAS protocol device and another device. That is, a SAS protocol receiver may use the detector 11 to detect the inverted ALIGN(0) primitive and automatically change the parity logic 13 of the receiver and thereby ensure that subsequent communications between the devices continue.

Although shown and described with specific respect to the SAS protocol and more specifically the ALIGN(0) primitive, the invention is not intended to be so limited. As mentioned, other protocols exist that do not include a specific polarity checking sequence for automatic detection and correction of data inversions. However, these other protocols may include certain protocol sequences (e.g., "control sequences") that may be deemed invalid when inverted. Accordingly, a detector as described herein may be configured with such devices to automatically correct data inversions based on their inverted protocol sequences. With SAS protocol devices, the ALIGN(0) primitive is transmitted at the earliest stages of communications. Accordingly, a SAS protocol receiver configured to detect the inverted ALIGN(0) primitive may have certain advantages because the data can be automatically corrected such that communications with another SAS protocol device can be continued without physical intervention (e.g., recoupling the differential signal pair of wires at the physical interface). However, other SAS primitives may be used to detect data inversions in a similar fashion.

Figure 2:
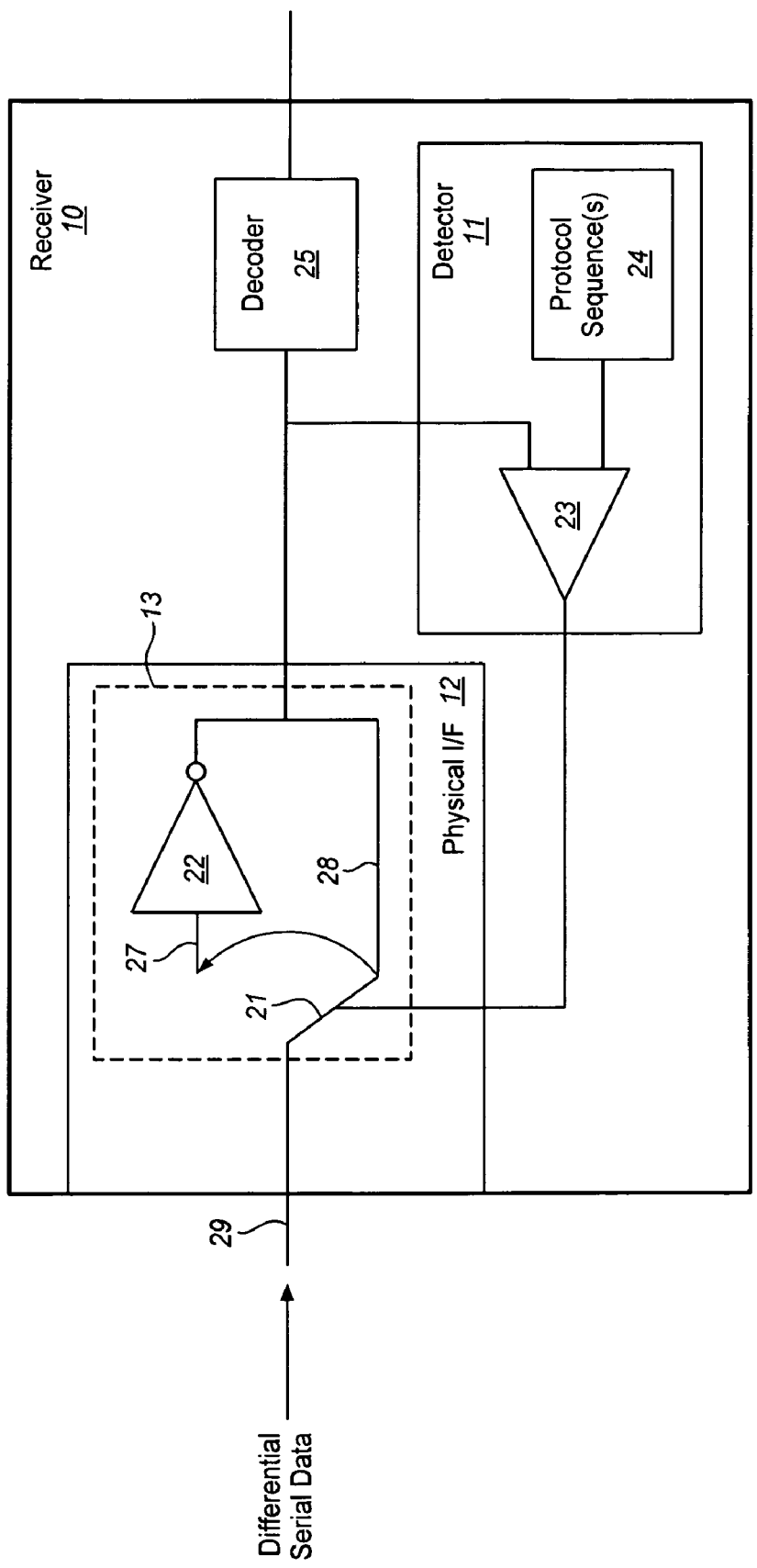
FIG. 2 is a block diagram of the receiver of FIG. 1 exemplarily illustrating polarity logic.

FIG. 2 provides additional insight regarding the detection and polarity correction of a data inversion within a received data sequence. More specifically, FIG. 2 exemplarily illustrates polarity inversion logic that may be involved with the physical interface 12. In this embodiment, data is shown as being initially received along the data path 29 as it interfaces with the physical interface 12. Once the data is received by the physical interface 12, the data may be routed along the data path 28 to the decoder 25. The detector 11 monitors the data being received by the physical interface 12 to determine whether a received sequence is an invalid or inverted protocol sequence. In this regard, the detector 11 may include a comparator 23 that has an input communicatively coupled to monitor the data being received by the physical interface 12. Another input of the comparator 23 is communicatively coupled to receive one or more valid protocol sequences 24. The comparator 23, in general, compares a received sequence of data to determine whether the received sequence is an invalid protocol.

The comparator 23 may compare a received sequence to a list of valid protocol sequences to determine whether the received sequence is a valid protocol sequence (e.g., determine whether the received sequence matches one of the valid protocol sequences). If the received sequence matches one of the valid protocol sequences, the comparator 23 acquiesces and the physical interface 12 allows the data to pass unchanged. If however the received sequence does not match one of the valid protocol sequences, the comparator 23 may generate a control signal that is used by the polarity logic 13 to switch the polarity of subsequent received data. In this regard, the physical interface 12 may include a switch 21 that receives the control signal from the comparator 23 to switch subsequent received sequences to the data path 27. From there, the subsequent received data sequences pass through the inverter 22 where the polarity is inverted to the correct receive polarity. Thus, the receiver 10 may automatically detect and correct the polarity of the received data without the need for a specific polarity checking sequence of data.

Since the receiver 10 generally expects to receive a valid protocol sequence, the receiver need not be reconfigured to store a list of valid protocol sequences 24 for the purposes of determining the polarity of the received sequence. Rather, the detector 11 may store one or more valid protocol sequences (e.g., in the computer memory of a device controller) that are in inverted polarity to be used in the detection of a polarity inversion. For example, detection of a polarity inversion may be desired at the onset of communications between two devices. A device controller, therefore, may store an inverted yet valid communication protocol sequence that is expected in the early communications between devices. The comparator 23 may compare the received sequence to the inverted communication protocol sequence to determine whether the two sequences match. In the event that the two sequences match, the comparator 23 may generate a control signal is used by the polarity logic 13 to invert the received data.

Once the polarity has been corrected, the detector 11 may disengage and the subsequent received data may be decoded via the decoder 25. For example, once the polarity inversion has been detected in the received data, the detector 11 may generate a control signal to automatically correct the polarity inversion. Subsequent received data is thus received in the correct polarity and no further detection is generally required. In the case of the SAS protocol, once an inverted ALIGN(0) protocol sequence is received, subsequent inverted ALIGN(0) protocol sequences are corrected such that communications can continue. Generally, polarity inversions after such a correction are no longer probable so there is no need to check for data inversions. The decoder 25 may be configured for decoding the received protocol sequences according to an 8 b/10 b format (or some other line coding, such as 4B/3T). Line encoding is generally understood and is used to achieve DC-balance and bounded disparity while providing enough state changes to allow clock recovery.

Figure 3:
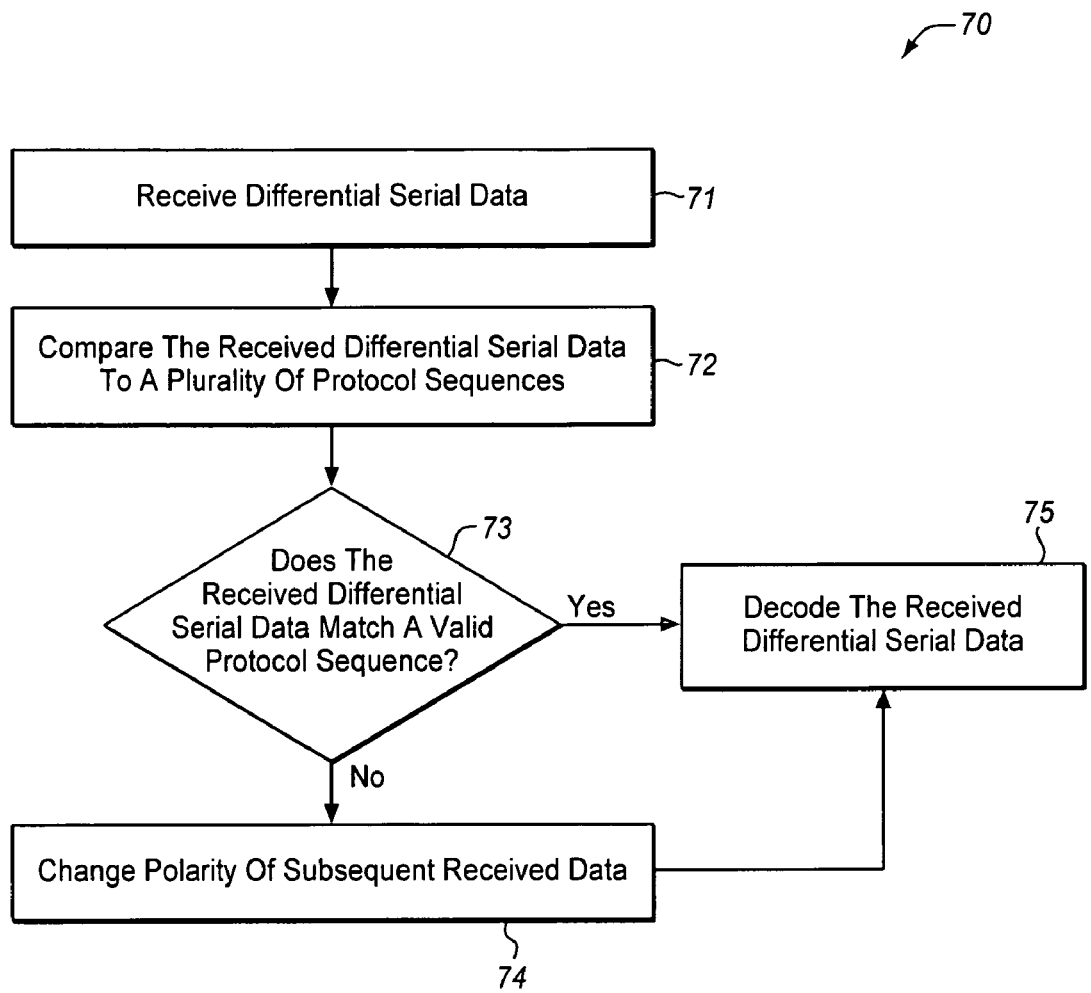
FIG. 3 is a flow chart of a process for detecting polarity inversions in differential serial data and automatically correcting those polarity inversions.

FIG. 3 is a flow chart of a process 70 for detecting polarity inversions in differential serial data and automatically correcting those polarity inversions. In this embodiment, differential serial data is received, in the process element 71. For example, a first device may establish communications with a second device via a differential serial data connection (e.g., a twisted pair). This communications may include formatting the differential serial data according to a particular communication protocol, such as the SAS protocol or the Firewire protocol. Accordingly, a receiving device may expect to receive a certain protocol sequence to establish the communications. In this regard, the receiving device may compare the received differential serial data to a plurality of protocol sequences, in the process element 72. A decision may be made, in the process element 73, to determine whether the received differential serial data matches a valid protocol sequence. If the received differential serial data does match a valid protocol sequence, that data may be decoded, in the process element 75. For example, the differential serial data may be encoded according to an 8 b/10 b format (or some other line coding, such as 4B/3T). A decoder may decode received sequences data in accordance with that format. If, however, a decision is made that the received differential serial data does not match a valid protocol sequence (e.g., the received data matches an inverted vertical sequence), the polarity of subsequent received ///data is changed, in the process element 74, such that the data may be properly decoded in the process element 75.

Certain advantages exist with the embodiments described hereinabove. For example, when a computer device uses a communication protocol that does not have a polarity correction sequence, care must be taken to ensure that the connection of the computer device to another computer device sends and receives data in the appropriate polarity. The embodiments described herein provide a means for relieving this connection burden during, for example, the assembly process. Moreover, the receiving device is able to correct polarity inversions independent of a transmitting device. In other words, polarity correction in the receiving device can be achieved without the transmitting device having knowledge of the polarity correction.

Additionally, while the embodiments described herein may be useful to LVDS, the invention is not intended to be so limited. Rather, the embodiments are merely intended to illustrate examples of polarity inversion detection and correction that may be employed with virtually any protocol that does not already employ polarity detection and correction.

While the invention has been illustrated and described in the drawings and foregoing description, such illustration and description is to be considered as exemplary and not restrictive in character. One embodiment of the invention and minor variants thereof have been shown and described. protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method, comprising:
   receiving differential serial data;
   detecting a polarity inversion in the received differential serial data by determining an invalid sequence in the received differential serial data; and
   changing polarity of subsequent received differential serial data in response to detecting the polarity inversion.

2. The method of claim 1, further comprising
   decoding the received differential serial data from a first data format to a second data format.

3. The method of claim 2, wherein
   the first data format is a ten bit data format and the second data format is an eight bit data format.

4. The method of claim 1, wherein
   the received differential serial data is formatted according to a communication protocol.

5. The method of claim 4, wherein
   the communication protocol is a Serial Attached Small Computer System Interface (SAS) protocol and wherein the invalid sequence is an inverted SAS primitive.

6. The method of claim 4, wherein
   the communication protocol is devoid of a polarity checking sequence.

7. The method of claim 4, wherein
   said detecting a polarity inversion comprises comparing a received sequence to a valid communication protocol sequence.

8. The method of claim 1, wherein
   said changing polarity comprises automatically changing polarity of the subsequent received differential serial data in response to detecting the polarity inversion, wherein automatically changing the polarity is performed independent of an external device used to transmit the differential serial data.

9. The method of claim 1, further including
   changing polarity of the invalid sequence in response to detecting the polarity inversion.

10. A data receiver, comprising:
    a data interface adapted to receive differential serial data;
    a detector communicatively coupled to the data interface and adapted to detect a data inversion in the received differential serial data, wherein the detector detects the data inversion by determining an invalid sequence in the received differential serial data and wherein the detector is further adapted to generate a control signal used to change polarity of subsequent differential serial data; and
    data inversion logic adapted to receive the control signal and change the polarity of the received differential serial data.

11. The data receiver of claim 10, wherein
    the invalid sequence is an inverted Serial Attached Small Computer System Interface (SAS) primitive.

12. The data receiver of claim 11, wherein
    the inverted SAS primitive is an ALIGN(0) primitive.

13. The data receiver of claim 10, further comprising
    a decoder communicatively coupled to the data interface and adapted to decode the received differential serial data from a first data format to a second data format.

14. The data receiver of claim 13, wherein
    the received differential serial data comprises an 8b/10b encoding, wherein the first data format is a 10 bit format and the second data format is an 8 bit data format.

15. A computer readable media for detecting a polarity inversion in received differential serial data and automatically correcting the polarity inversion, the computer readable media including software instructions that, when executed by a computer processor, direct the computer processor to:
    receive differential serial data;
    detect a polarity inversion in the received differential serial data by determining an invalid sequence in the received differential serial data; and
    change polarity of subsequent received differential serial data in response to detecting the polarity inversion.

16. The computer readable media of claim 15, further comprising
    instructions that, when executed by a computer processor, direct the computer processor to decode the received differential serial data from a first data format to a second data format, wherein the first data format is a ten bit data format and the second data format is an eight bit data format.

17. The computer readable media of claim 15, wherein
    the received differential serial data is formatted according to a communication protocol that is devoid of a polarity checking sequence and wherein detection of the polarity inversion comprises comparing a received sequence to a valid communication protocol sequence.

18. The computer readable media of claim 17, wherein the communication protocol is a Serial Attached Small Computer System Interface (SAS) protocol and wherein the invalid sequence is an inverted SAS primitive.

19. The computer readable media of claim 15, wherein said changing polarity comprises automatically changing polarity of the subsequent received differential serial data in response to detecting the polarity inversion, wherein automatically changing the polarity is performed independent of an external device used to transmit the differential serial data.

* * * * *